United States Patent
Ahlqvist et al.

(10) Patent No.: US 9,674,718 B2
(45) Date of Patent: Jun. 6, 2017

(54) MICROWAVE LINK CONTROL

(75) Inventors: Fredrik Ahlqvist, Fjaras (SE); Mats Rydström, Billdal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 37 days.

(21) Appl. No.: 14/420,105

(22) PCT Filed: Aug. 9, 2012

(86) PCT No.: PCT/EP2012/065570
§ 371 (c)(1),
(2), (4) Date: Feb. 6, 2015

(87) PCT Pub. No.: WO2014/023351
PCT Pub. Date: Feb. 13, 2014

(65) Prior Publication Data
US 2015/0208260 A1 Jul. 23, 2015

(51) Int. Cl.
*H04W 24/08* (2009.01)
*H04W 40/12* (2009.01)
(Continued)

(52) U.S. Cl.
CPC ........... *H04W 24/08* (2013.01); *H04L 1/0001* (2013.01); *H04L 1/0003* (2013.01);
(Continued)

(58) Field of Classification Search
CPC ... H04L 1/0001; H04L 1/0002; H04L 1/0003; H04L 1/0009; H04L 1/0019; H04L 1/0026; H04L 1/0033; H04L 1/0034; H04L 1/20; H04L 27/0008; H04L 27/3405; H04L 45/125; H04L 5/0007; H04L 5/0026; H04L 5/0048; H04L 5/14; H04B 3/32; H04B 3/46; H04B 3/487; H04B 3/50; H04B 7/0626; H04B 10/272; H04B 10/564; H04B 17/309; H04B 1/44; H04B 7/024; H04B 7/04; H04B 7/0413; H04B 7/0602; H04B 7/0617; H04B 7/0691; H04B 7/0802;
(Continued)

(56) References Cited

U.S. PATENT DOCUMENTS 4,852,090 A * 7/1989 Borth ...................... H04B 7/005
370/347
5,117,239 A * 5/1992 Riza ...................... H01Q 3/2676
342/158

(Continued)

FOREIGN PATENT DOCUMENTS

| EP | 1755238 A1 | 2/2007 |
|---|---|---|
| EP | 2395792 A1 | 12/2011 |
| JP | 2004363679 A | 12/2004 |

*Primary Examiner* — Michael Thier
*Assistant Examiner* — Eric Nowlin
(74) *Attorney, Agent, or Firm* — Rothwell, Figg, Ernst & Manbeck, P.C.

(57) ABSTRACT

Data packets in a communications signal on a microwave link are received by a microwave link modem. One or more link performance degradation indicators in the data packets are detected by processing the communications signal. The microwave link modem provides to a packet control unit information relating to the one or more link performance degradation indicators such that control of the microwave link is facilitated.

28 Claims, 9 Drawing Sheets

(51) Int. Cl.
*H04W 72/08* (2009.01)
*H04W 76/04* (2009.01)
*H04L 1/00* (2006.01)
*H04L 1/20* (2006.01)
*H04L 12/729* (2013.01)

(52) U.S. Cl.
CPC .............. *H04L 1/0019* (2013.01); *H04L 1/20* (2013.01); *H04L 45/125* (2013.01); *H04W 40/12* (2013.01); *H04W 72/082* (2013.01); *H04W 76/04* (2013.01)

(58) Field of Classification Search
CPC ... H04B 7/0817; H04B 7/0874; H04W 40/12; H04W 52/0245; H04W 72/082; H04W 76/04; H04M 3/34
See application file for complete search history.

(56) References Cited

U.S. PATENT DOCUMENTS

| | | | | |
|---|---|---|---|---|
| 5,408,679 | A * | 4/1995 | Masuda | H04B 7/2606 455/11.1 |
| 5,905,721 | A * | 5/1999 | Liu | H04B 1/707 370/342 |
| 6,298,092 | B1 * | 10/2001 | Heath, Jr. | H01Q 1/246 375/267 |
| 6,449,463 | B1 * | 9/2002 | Schiff | H04W 52/12 455/115.3 |
| 6,496,140 | B1 * | 12/2002 | Alastalo | H01Q 3/267 342/174 |
| 7,162,261 | B1 * | 1/2007 | Yarkosky | H04B 7/0608 455/101 |
| 7,403,748 | B1 * | 7/2008 | Keskitalo | H04B 7/06 455/101 |
| 7,502,336 | B2 * | 3/2009 | Romano | H04L 5/0046 370/286 |
| 7,830,817 | B1 * | 11/2010 | Oh | H04L 1/0002 370/252 |
| 7,890,061 | B2 * | 2/2011 | Kasher | H04W 16/14 370/254 |
| 8,023,899 | B2 * | 9/2011 | Morton | H04B 1/1027 455/296 |
| 8,068,872 | B2 * | 11/2011 | Molnar | H04B 7/024 375/267 |
| 8,379,751 | B2 * | 2/2013 | Lin | H04B 7/0608 375/267 |
| 8,442,430 | B2 * | 5/2013 | Hwang | H04B 7/022 455/11.1 |
| 8,548,385 | B2 * | 10/2013 | Sofer | H04B 7/0608 342/350 |
| 8,688,157 | B2 * | 4/2014 | Wang | H04B 7/0408 455/450 |
| 8,838,137 | B2 * | 9/2014 | Bhattacharya | G01S 5/0273 455/456.1 |
| 8,867,446 | B2 * | 10/2014 | Kang | H04B 7/061 370/328 |
| 8,897,712 | B2 * | 11/2014 | Sofer | H04B 7/0608 342/350 |
| 8,897,834 | B2 * | 11/2014 | Molnar | H04B 7/024 370/334 |
| 9,001,717 | B2 * | 4/2015 | Chun | H04L 5/0023 370/310 |
| 9,001,879 | B2 * | 4/2015 | Maltsev | H04B 7/0413 375/227 |
| 9,025,524 | B2 * | 5/2015 | Lee | H04W 56/0085 370/328 |
| 9,042,941 | B2 * | 5/2015 | Fleming | H04B 7/024 370/241.1 |
| 9,094,060 | B2 * | 7/2015 | Kang | H04B 7/022 |
| 9,124,318 | B2 * | 9/2015 | Du | H04B 7/0452 |
| 9,198,047 | B2 * | 11/2015 | Kang | H04B 7/061 |
| 9,215,713 | B2 * | 12/2015 | Kang | H04W 72/046 |
| 9,219,531 | B2 * | 12/2015 | Sofer | H04B 7/0608 |
| 9,270,346 | B2 * | 2/2016 | Ahmadi | H04B 7/024 |
| 9,271,295 | B2 * | 2/2016 | Lee | H04L 1/0072 |
| 9,276,648 | B2 * | 3/2016 | Lorca Hernando | H04B 7/0452 |
| 9,312,985 | B2 * | 4/2016 | Sanderovich | H04L 1/0015 |
| 9,397,731 | B2 * | 7/2016 | Molnar | H04B 7/024 |
| 9,432,866 | B2 * | 8/2016 | McCarthy | H04W 24/08 |
| 9,444,529 | B2 * | 9/2016 | Byun | H04B 7/024 |
| 9,484,991 | B2 * | 11/2016 | Sofer | H04B 7/0608 |
| 9,516,545 | B2 * | 12/2016 | Cheng | H04B 7/0689 |
| 2002/0191573 | A1 | 12/2002 | Whitehill et al. | |
| 2003/0112821 | A1 * | 6/2003 | Cleveland | H04L 1/0002 370/468 |
| 2004/0131028 | A1 * | 7/2004 | Schiff | H04B 7/18532 370/329 |
| 2004/0204026 | A1 * | 10/2004 | Steer | H04W 4/04 455/550.1 |
| 2005/0053094 | A1 | 3/2005 | Cain et al. | |
| 2006/0002457 | A1 * | 1/2006 | Romano | H04L 5/006 375/222 |
| 2006/0062284 | A1 * | 3/2006 | Li | H04B 1/71057 375/148 |
| 2006/0165091 | A1 * | 7/2006 | Arima | H04B 7/26 370/395.21 |
| 2007/0129011 | A1 * | 6/2007 | Lal | H04W 40/16 455/20 |
| 2007/0135161 | A1 * | 6/2007 | Molnar | H04B 7/024 455/553.1 |
| 2007/0195715 | A1 | 8/2007 | Yamano et al. | |
| 2007/0224953 | A1 * | 9/2007 | Nakagawa | H04B 7/0802 455/140 |
| 2008/0137585 | A1 * | 6/2008 | Loyola | H04B 7/15521 370/315 |
| 2008/0192705 | A1 * | 8/2008 | Suzuki | H04L 1/0061 370/335 |
| 2008/0304590 | A1 * | 12/2008 | Sundberg | H04L 1/005 375/260 |
| 2009/0247200 | A1 * | 10/2009 | Hwang | H04B 7/022 455/507 |
| 2010/0067489 | A1 * | 3/2010 | Pelletier | H04W 48/17 370/331 |
| 2010/0167657 | A1 * | 7/2010 | Molnar | H04W 24/10 455/67.11 |
| 2010/0248643 | A1 * | 9/2010 | Aaron | H04L 1/0002 455/68 |
| 2011/0039496 | A1 * | 2/2011 | Chueh | H04J 11/0036 455/63.1 |
| 2011/0044376 | A1 * | 2/2011 | Lin | H04B 7/0608 375/130 |
| 2011/0081930 | A1 * | 4/2011 | Shimonabe | H04B 7/04 455/507 |
| 2011/0143692 | A1 * | 6/2011 | Sofer | H04B 7/0608 455/88 |
| 2011/0149836 | A1 * | 6/2011 | Hong | H04B 7/18543 370/316 |
| 2011/0211622 | A1 * | 9/2011 | Wang | H04B 7/0408 375/220 |
| 2011/0218000 | A1 * | 9/2011 | Noh | H04W 52/267 455/501 |
| 2012/0058767 | A1 * | 3/2012 | Molnar | H04B 7/024 455/436 |
| 2012/0183093 | A1 * | 7/2012 | Zhu | H04B 7/024 375/285 |
| 2012/0202558 | A1 * | 8/2012 | Hedberg | H04L 5/0058 455/550.1 |
| 2012/0314649 | A1 * | 12/2012 | Forenza | H04B 7/024 370/328 |
| 2012/0314806 | A1 * | 12/2012 | Kang | H04B 7/0417 375/296 |
| 2012/0320831 | A1 * | 12/2012 | Lee | H04W 56/0085 370/328 |
| 2012/0322477 | A1 * | 12/2012 | Kang | H04B 7/022 455/501 |
| 2013/0016671 | A1 * | 1/2013 | Cheng | H04W 48/20 370/329 |

(56) References Cited

U.S. PATENT DOCUMENTS

| | | | |
|---|---|---|---|
| 2013/0028218 A1* | 1/2013 | Chun | H04L 5/0023 370/329 |
| 2013/0029711 A1* | 1/2013 | Kang | H04W 72/046 455/509 |
| 2013/0077580 A1* | 3/2013 | Kang | H04B 7/061 370/329 |
| 2013/0094384 A1* | 4/2013 | Park | H04L 1/0026 370/252 |
| 2013/0142054 A1* | 6/2013 | Ahmadi | H04B 7/024 370/252 |
| 2013/0172050 A1* | 7/2013 | Fleming | H04B 7/024 455/562.1 |
| 2013/0215845 A1* | 8/2013 | Lee | H04L 1/0072 370/329 |
| 2013/0267173 A1* | 10/2013 | Ling | H04B 5/00 455/41.1 |
| 2013/0272437 A1* | 10/2013 | Eidson | H04B 7/0413 375/267 |
| 2013/0288727 A1* | 10/2013 | Chirayil | H04W 24/08 455/501 |
| 2014/0018005 A1* | 1/2014 | Sofer | H04B 7/0608 455/63.4 |
| 2014/0066088 A1* | 3/2014 | Bhattacharya | G01S 5/0273 455/456.1 |
| 2014/0126620 A1* | 5/2014 | Maltsev | H04B 7/0413 375/227 |
| 2014/0177746 A1* | 6/2014 | Hsu | H04B 7/0452 375/267 |
| 2014/0185551 A1* | 7/2014 | Sanderovich | H04L 1/0033 370/329 |
| 2014/0269964 A1* | 9/2014 | Du | H04B 7/0452 375/267 |
| 2014/0348255 A1* | 11/2014 | Lorca Hernando | H04B 7/0452 375/267 |
| 2014/0364113 A1* | 12/2014 | Kang | H04B 7/061 455/422.1 |
| 2015/0043474 A1* | 2/2015 | Takeda | H04L 1/00 370/329 |
| 2015/0071062 A1* | 3/2015 | Cheng | H04B 7/0689 370/230 |
| 2015/0080005 A1* | 3/2015 | Molnar | H04B 7/024 455/452.1 |
| 2015/0111502 A1* | 4/2015 | Sofer | H04B 7/0608 455/63.4 |
| 2015/0222333 A1* | 8/2015 | Maltsev | H04B 7/0413 375/295 |
| 2015/0304009 A1* | 10/2015 | Kang | H04B 7/022 370/329 |
| 2015/0365157 A1* | 12/2015 | Yang | H04B 7/024 370/329 |
| 2016/0072598 A1* | 3/2016 | Jonsson | H04B 7/0413 455/67.11 |
| 2016/0080044 A1* | 3/2016 | Sofer | H04B 7/0608 455/63.4 |
| 2016/0112100 A1* | 4/2016 | Kang | H04B 7/061 370/329 |
| 2016/0112167 A1* | 4/2016 | Xu | H04L 5/005 370/329 |
| 2016/0112889 A1* | 4/2016 | Moon | H04B 7/0452 370/252 |
| 2016/0191176 A1* | 6/2016 | O'Keeffe | H01Q 3/267 455/63.4 |
| 2016/0248483 A1* | 8/2016 | Ahmadi | H04B 7/024 |
| 2016/0277253 A1* | 9/2016 | Uyehara | H04W 24/02 |
| 2016/0294460 A1* | 10/2016 | Karsi | H04B 7/0608 |
| 2016/0329944 A1* | 11/2016 | Molnar | H04B 7/024 |
| 2016/0337021 A1* | 11/2016 | Sung | H04B 7/0632 |
| 2016/0344483 A1* | 11/2016 | Kareisto | H04B 17/12 |

* cited by examiner

MICROWAVE LINK CONTROL

CROSS-REFERENCE TO RELATED APPLICATION

This application is a 35 U.S.C. §371 National Phase Entry Application from PCT/EP2012/065570, filed Aug. 9, 2012, and designating the United States.

TECHNICAL FIELD

Embodiments presented herein relate to microwave communication networks and to microwave link control in microwave communication networks in particular.

BACKGROUND

In microwave communication networks, there is always a challenge to obtain good performance and capacity for a given communications protocol, its parameters and the physical environment in which the microwave communication network is deployed.

Some microwave link based networks implement the possibility to utilize so-called adaptive modulation. According to adaptive modulation the transmission rate of a microwave link is adapted to current propagation conditions in real-time; when channel conditions of the link are favorable the transmission rate is increased and when conditions of the link are not favorable transmission (at high rate) is decreased. In terms of protocol stack levels, adaptive modulation is associated with the physical layer (also denoted layer one).

When using adaptive modulation the maximum transmission rate is not limited by worst case conditions as is the case in systems with a static (i.e. non-adaptive) transmission rate and therefore the average link throughput in terms of bits per second and hertz can be significantly increased in many cases. The changes in rate are hitless, i.e., they occur without any bit errors in the forwarded traffic. Since this is a layer one technology, transmission rate changes can be performed rapidly, hence resulting in significant changes in bandwidth over short time durations (in the order of tens of milliseconds for a microwave backhaul application). As herein used, the term bandwidth refers to various bit-rate measures, representing the available or consumed data communication resources expressed in bits/second.

Microwave based mobile backhaul networks may be provided with path redundant topologies. Necklace, ring and meshed topologies are examples being deployed all the way to the cell sites. This means that several possible paths exist when traversing a network from point A to point B.

Combining redundant topologies with un-coordinated adaptive modulation on individual links yields a network where the optimal paths through the network are dependant on the current radio conditions on the links and therefore may change rapidly over time. Small temporal bandwidth changes can to some extent be smoothed out by buffering. In case of longer periods of altered bandwidth, traffic should be switched to an alternate path with available bandwidth that can sustain the traffic.

Within ITU-T SG15 there is an effort triggered to further elaborate on protection mechanism taking into account adaptive bandwidth links. Several proposed ways forward exist, all with the commonality that the granularity of the mechanisms above should be increased. However, there is a need for improved microwave link control in microwave communication networks.

SUMMARY

An object of embodiments herein is to improve microwave link control in microwave communication networks.

The inventors of the enclosed embodiments have through a combination of practical experimentation and theoretical derivation discovered that apart from raw network throughput, stability and availability may in some situations be important factors for a packet based network. For example, excessive network state changes may limit the abilities of the network and can potentially render the network unstable. Network state changes may not only need to be handled by the network itself, but also by the network clients. Therefore, any changes in network state should preferably be contained in a well defined area and be driven with some foresight. A particular object is therefore to provide information relating to the one or more link performance degradation indicators such that control of a microwave link is facilitated. According to a first aspect a method for microwave link control is provided. According to the method data packets in a communications signal on a microwave link are received by a microwave link modem. One or more link performance degradation indicators in the data packets is/are detected by processing the communications signal. A packet control unit is by the microwave link modem provided with information relating to the one or more link performance degradation indicators such that control of the microwave link is facilitated.

Advantageously this enables the packet control domain to gain access to link characterization determined by the microwave modem. Further, the disclosed embodiments enable improved control over the network level aspects during adaptive modulation transmission conditions throughout the links of the network. Several links may experience adaptive modulation simultaneously resulting in several sources for bandwidth change events. The disclosed embodiments enable improved control of if and/or how these conditions should induce any change either locally, for any of the entities subjecting link(s) to traffic or on a broad network level scale to entities responsible for path calculations. Further, the disclosed embodiments improve the stability of the overall network efficiency.

In networks where the state changes induced by adaptive modulation are as detrimental to performance as to limit the use of adaptive modulation, the disclosed embodiments may permit larger and faster changes in bandwidth. That is, additional trust in adaptive modulation may lead to lowered link budget that may be exchanged for smaller antennas and/or cheaper towers that finally reduces the price of transported bits.

According to a second aspect a microwave link modem is provided. The microwave link modem comprises an interface arranged to receive data packets in a communications signal on a microwave link. The microwave link modem further comprises a processing unit arranged to detect one or more link performance degradation indicators in the data packets by processing the communications signal. The microwave link modem further comprises an interface arranged to provide a packet control unit with information relating to the one or more link performance degradation indicators.

According to a third aspect there is presented a computer program for microwave link control. The computer program comprises computer program code which, when run on at least one processing unit causes the at least one processing unit to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the invention will now be described, by way of non-limiting examples, references being made to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

In general terms, in a communications network, such as a packet switched microwave link based network, there are a multitude of traffic flows between the nodes of the network. In this context a flow may be defined as traffic that must experience the same quality of service (QoS) when traversing the network and that can not be broken down into smaller entities of traffic without service degradation. A flow is typically a series of Internet protocol (IP) packets for a particular information exchange between two applications in the network.

Figure 1:
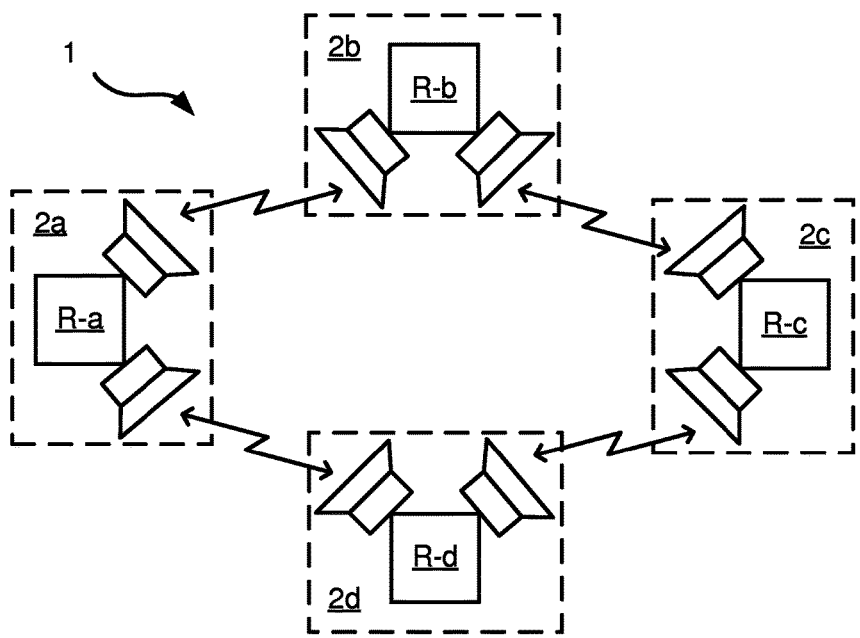
FIG. 1 is a schematic diagram illustrating a microwave communication network where embodiments presented herein may be applied.

FIG. 1 illustrates part of a microwave network 1. In more detail, FIG. 1 illustrates a small microwave based ring network 1 connecting four sites, or nodes, 2a, 2b, 2c, 2d. In this network the routers, R-a, R-b, R-c and R-d, have the possibility to map flows destined for any other site to paths laid out in any of the two ring directions. As an example, for site 2a to communicate with site 2c, site 2a first sends packets to either site 2b or site 2d. The site receiving the packets from 2a then forwards the packets to the destination site, i.e. site 2C. Whether to transmit the packets via site 2b or 2d may depend on properties on the links between site 2a and sites 2b and 2d, respectively. For example, for the packet technology domain to gain knowledge about the bandwidth state of a microwave link unavailable links may be detected. This may be achieved in the microwave domain by setting a minimum required bandwidth threshold for each microwave link. If the available bandwidth is lower than this value the link is declared to be in a link down state, i.e. as being unavailable, and no traffic is forwarded over that link. The link down state may be detected in the packet domain by failure detection mechanisms and the packet domain can then trigger movement of affected flows to an alternate backup path. For example, if the link between site 2a and 2b is determined to be in a link down state the site 2a may be able to communicate with site 2c via the site 2d. This is in effect a course active/standby mechanism influenced by one threshold value. Potentially it is possible to set a hold-off value and a wait-to-restore value to mitigate some fluctuation in link bandwidth.

Adaptive modulation increases average (and peak) link bandwidth by adapting modulation format to current transmission conditions as opposed to configuring the link according to worst case conditions. Thus adaptive modulation alleviates some problems associated with network throughput. However, by dynamically optimizing link throughput in this way, network state changes are introduced that can be severely detrimental to performance at network level. Due to this throughput vs. stability collision of interests, the extent to which adaptive modulation technology can be leveraged on in a network context is in some cases limited. The feasibility of exploiting adaptive link bandwidths generally becomes dependant on how well the offered bandwidth can be characterized and estimated forward in time, so that network state changes can be executed in a smooth and controlled way not harmful to any important network level functionality. If this characterization is not done properly, the network level gains from adaptive modulation may be small or even non-existent on a network level.

Figure 2:
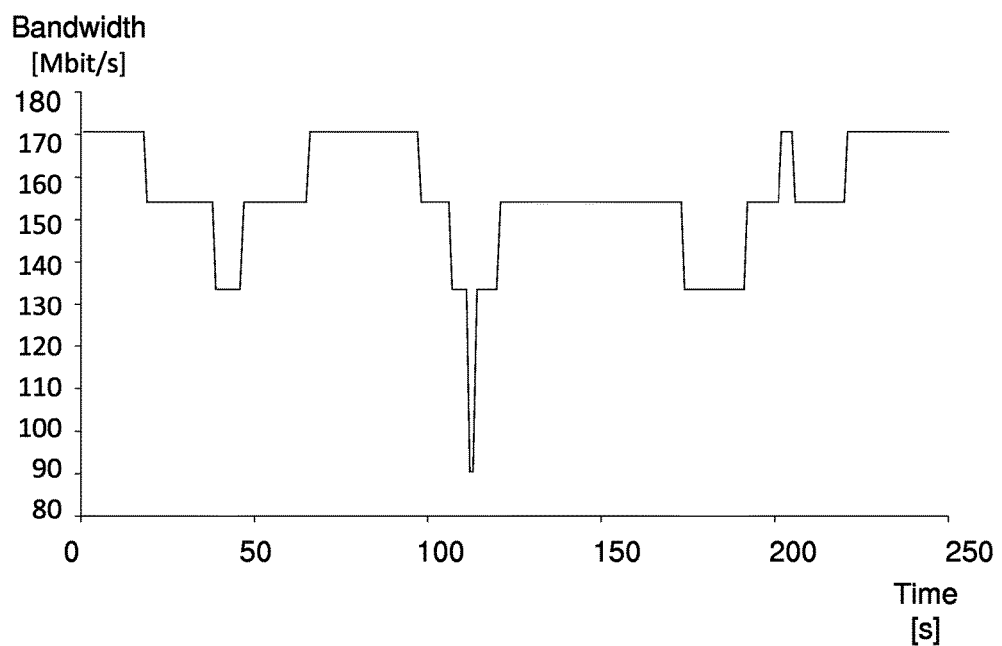
FIG. 2 schematically illustrates bandwidth as a function of time.

To exemplify, FIG. 2 illustrates a series of events occurring on an adaptive modulation enabled microwave hop during some 250 seconds. In total there are 16 changes in bandwidth. Freely ingesting these changes of bandwidth into the network, with the timing as in the diagram, in such a fashion that the traffic is rerouted and/or the network clients react by backing off may lead to sub-optimal performance.

The embodiments presented herein are based on the understanding that the signal processing functions of a microwave link modem may, in addition to optimizing the current offered bandwidth, also be arranged to characterize, estimate and to some extent predict the bandwidth state changes of the link. By appropriately shaping that information and propagating it directly to the packet control layer the lower layers in the communications protocol stack enable the control layer to execute a, on a network level, improved microwave link control.

Figure 3:
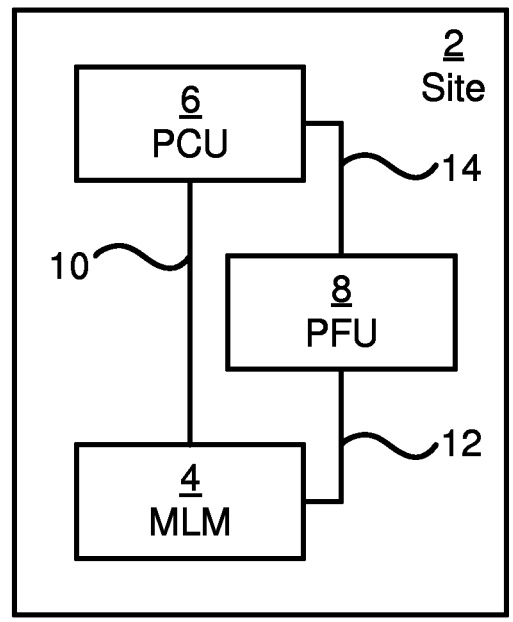
FIG. 3 is a schematic diagram showing functional modules of a microwave site.

FIG. 3 illustrates in terms of functional modules a microwave site 2 which could be readily applied as one of the sites 2a-d in the microwave network 1 of FIG. 1. These functional modules and their relations will be described in more detail below. The microwave site 2 comprises a microwave link modem 4, a packet forwarding unit 8 and a packet control unit 6. The microwave link modem 4 is arranged to access signal processing data and is enabled to execute estimates on the characteristics of the link. The microwave link modem 4 has an interface 12 (herein denoted interface A) towards the packet forwarding unit 8. The interface A operates at the current bandwidth and process actual payload. The microwave link modem 4 also has an interface 10 (herein denoted interface C) towards the packet control unit 6. The interface C conveys information on the estimates and predictions of bandwidth.

The packet forwarding unit 8 is arranged to forward packets over the link at the current bandwidth rate. The packet forwarding unit 8 has an interface 14 (herein denoted interface B) towards the packet control unit 6 for conveying current bandwidth.

The packet control unit 6 is enabled to transfer traffic to and from other paths through the network 1. As described above the packet control unit 6 has the interface A and interface C for communication with the microwave link modem 4 and the packet forwarding unit 8.

Figure 5:
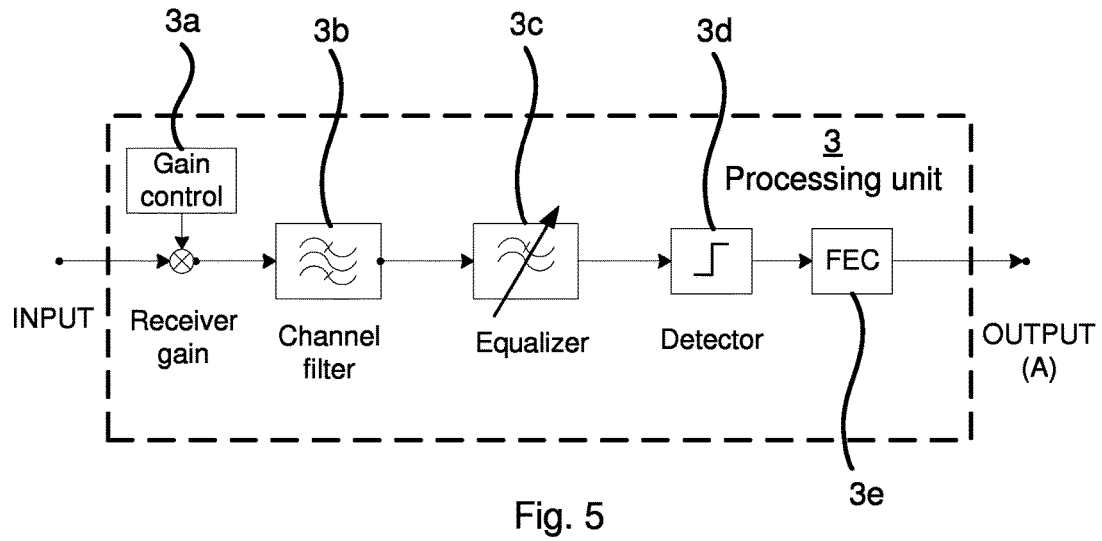
FIG. 5 is a schematic diagram showing functional modules of a processing unit.

Preferably the herein disclosed embodiments are implemented in the microwave link modem 4. The main signal processing components of a microwave link modem 2 are schematically illustrated in FIG. 5. As illustrated in FIG. 5 the signal processing components may be implemented by the processing unit 3. The received signal is first amplified by the receiver gain unit that thereby is enabled to control the input signal level by a gain control unit 3a. A channel filter 3b is arranged to separate in-band signal content from out-of-band signals that are suppressed and discarded. Intersymbol interference is removed by an adaptive equalizer 3c before the transmitted symbols are detected by the detector 3d and mapped to transmitted bits. The information bits of the forwarded packets are finally extracted by a forward error correction (FEC) unit 3e before being passed to the traffic handling functions, i.e., to interface A in FIG. 3.

Figure 6:
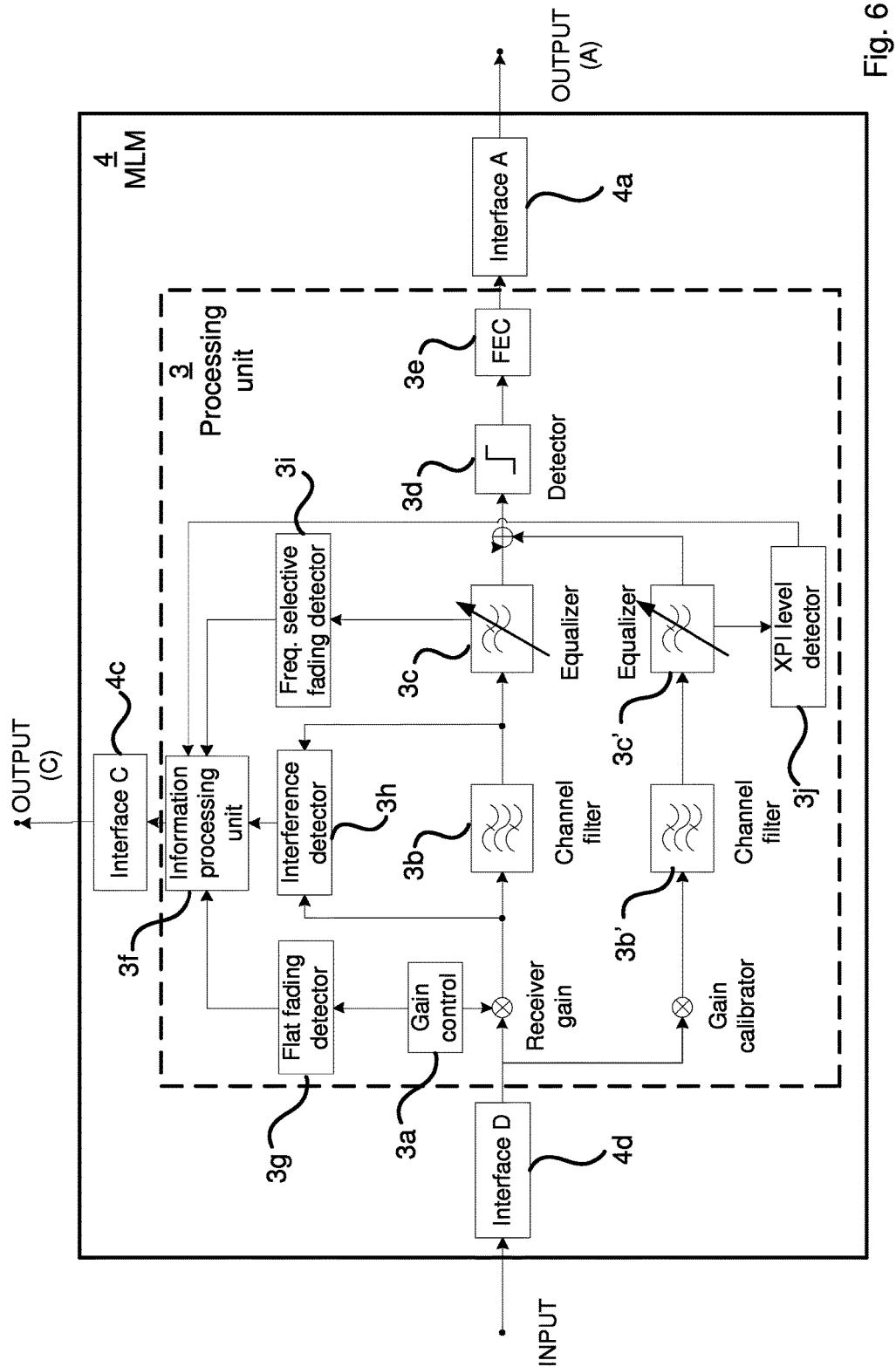
FIG. 6 is a schematic diagram showing functional modules of a microwave link modem.

FIG. 6 schematically illustrates a microwave link modem 4 in terms of a number of functional modules. The microwave link modem 4 comprises a processing unit 3. In FIG. 6 a detector 3g for flat fading, a detector 3i for frequency selective fading, and a detector 3h for external interference have been added to the signal processing components of the processing unit 3 illustrated in FIG. 5. The flat fading detector 3g detects the onset of flat fading by monitoring the received signal power, the interference detector 3h detects the presence of an interferer by monitoring loss of signal power due to channel filtering, and the onset of frequency selective fading is detected by means of monitoring the magnitude of equalizer taps. The microwave link modem 4 may further comprise a detector 3j for increased cross-polar interference, XPI. The XPI may be handled by a cross-polar interference cancellation (XPIC) system by means of a channel filter 3b' and an equalizer 3c', in addition to the XPI detector 3j. The results of the detectors are provided to an information processing unit 3f. In general terms, the processing unit 3 is provided using any combination of one or more of a suitable central processing unit (CPU), multiprocessor, microcontroller, digital signal processor (DSP), application specific integrated circuit (ASIC) etc., capable of executing software instructions stored in a computer program product 18 (as in FIG. 4. The processing unit 3 is thereby preferably arranged to execute methods as herein disclosed. The microwave link modem 4 further comprises an interface D 4d arranged to receive data packets in a communications signal on a microwave link. The microwave link modem 4 further comprises an interface C 4c arranged to provide a packet control unit 6 with information processed by the microwave link modem 4. The microwave link modem 4 further comprises an interface A 4a arranged to provide a packet forwarding unit 8 with bits decoded by the microwave link modem 4.

Figure 4:
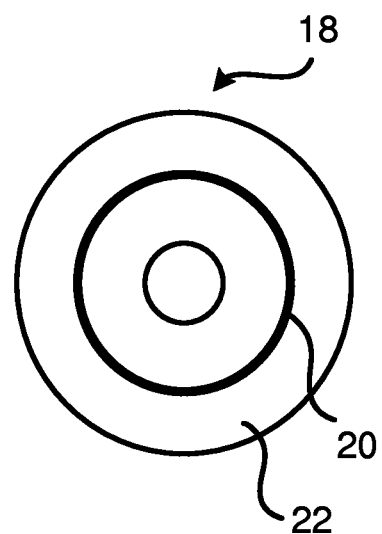
FIG. 4 shows one example of a computer program product comprising computer readable means.
Figure 15:
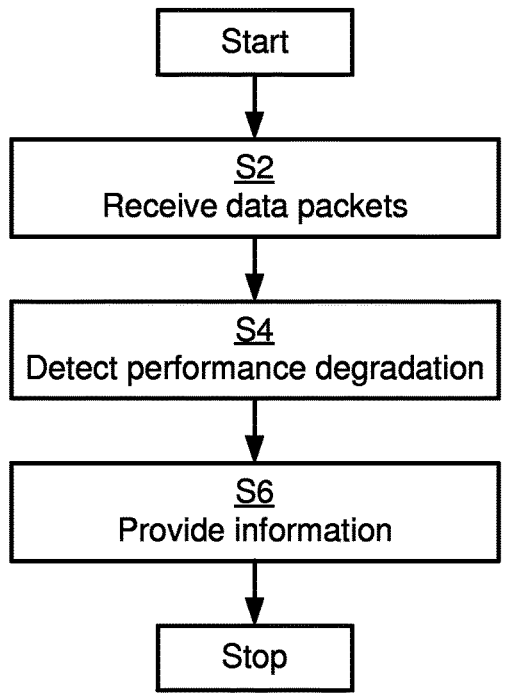
FIGS. 15 and 16 are flowcharts of methods according to embodiments.
Figure 16:
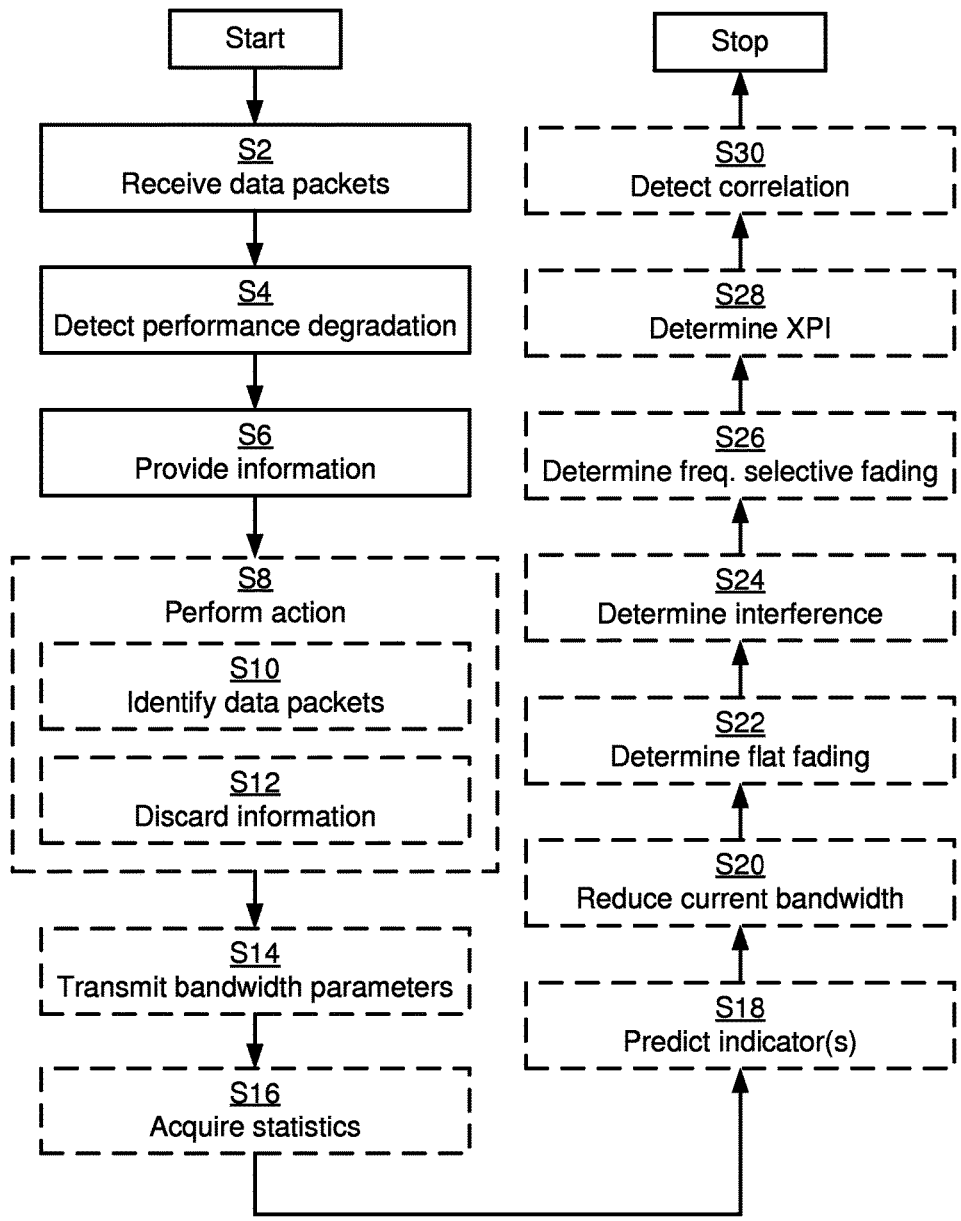
Figure 7:
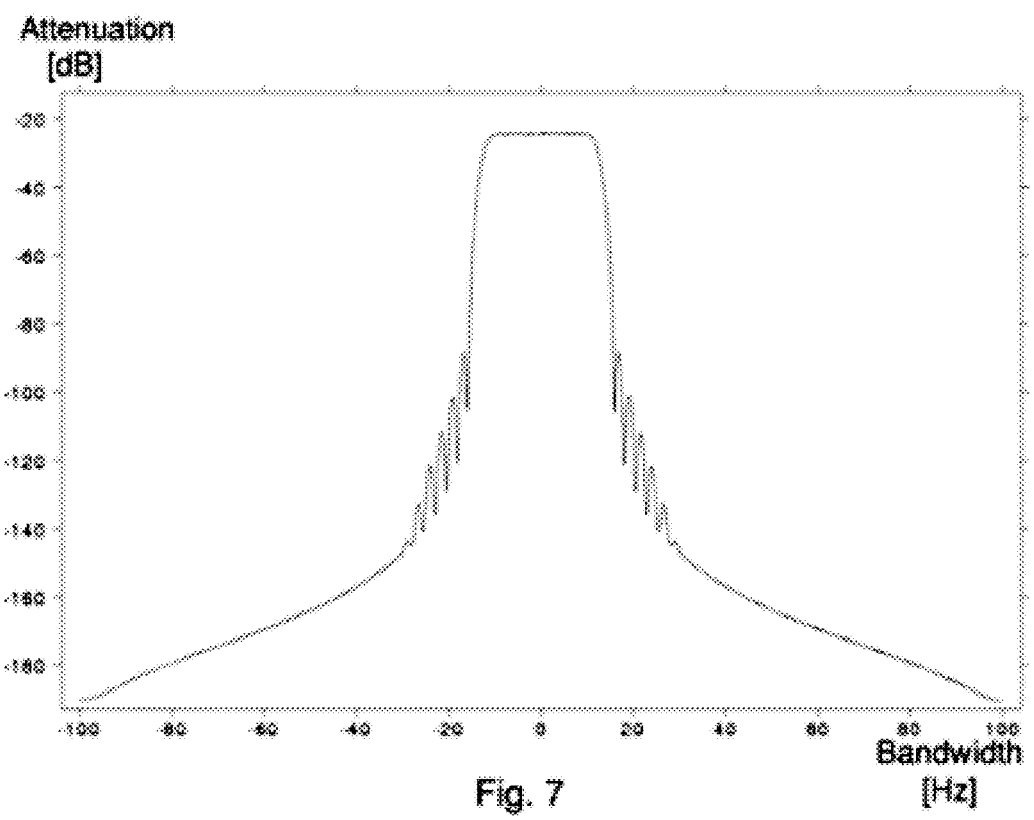

A method for microwave link control whereby networks that uses microwave links may be optimized will now be disclosed with references to the flowcharts of FIGS. 15 and 16 as well as the system 1 of FIG. 1, the site 2 of FIG. 2, and the microwave link modem of FIG. 6. The methods are preferably performed in the microwave link modem 4 and thereto coupled entities and devices. The methods are advantageously provided as computer programs 18. FIG. 4 shows one example of a computer program product 18 comprising computer readable means 22. On this computer readable means 22, a computer program 20 can be stored, which computer program 20 can cause the processing unit 3 and thereto operatively coupled entities and devices, such as interface A, C and D to execute methods according to embodiments described herein. In the example of FIG. 4, the computer program product 18 is illustrated as an optical disc, such as a CD (compact disc) or a DVD (digital versatile disc) or a Blu-Ray disc. The computer program product could also be embodied as a memory (RAM, ROM, EPROM, EEPROM) and more particularly as a non-volatile storage medium of a device in an external memory such as a USB (Universal Serial Bus) memory. Thus, while the computer program 20 is here schematically shown as a track on the depicted optical disk, the computer program 20 can be stored in any way which is suitable for the computer program product 18.

In a step S2 the microwave link modem 4 receives data packets in a communications signal on a microwave link. The data packets are in the microwave link modem 4 received by the interface D.

According to embodiments the performance degradation relates to a bandwidth reduction of the microwave link. Several commonly occurring physical phenomena influence the effective bandwidth of a radio link implementing adaptive modulation and hence the communications signal received by the microwave link modem 4. This causes network state changes that can appear random at the network level and hence may be difficult to characterize and predict. The main root causes of modulation rate change include, but are not limited to, rain, fog, and snow that cause signal attenuation (so-called flat fading) and cross-polar leakage, frequency selective fading arising due to multi-path propagation that distort the received signal by introducing intersymbol interference (ISI) in the received signal, and external interference arising from neighboring radio frequency transmitters. From a signal processing point of view these events affect the received signal in different ways, and the microwave link modem 4 can therefore determine which (combination of) events that led to a reduction of signal quality and a resulting change in link bandwidth. These different events are also expected to have different impacts on bandwidth, and to be of varying time duration. The effect of these events in terms of bandwidth change generally depends on the individual radio link installation in terms of link budget and fading margin, and geographical properties of the installation site such as the frequency of heavy rains and the frequency planning. Thus, to further complicate the matter, any attempt to characterize and/or predict the occurrence and consequences of such events must be made on an individual radio link basis. In a step S4 one or more link performance degradation indicators are therefore detected in the data packets received by interface D. The one or more link performance degradation indicators are detected by the processing unit 3 processing the received communications signal.

Flat fading causes a drop in received signal power. The onset of flat fading can be detected by monitoring the total receiver gain, i.e., both analog and digital amplification. Processing the communications signal may thus comprise in a step S22 determining onset and level of flat fading for the communications signal. The drop in received signal power is detected by the gain control module and is compensated for by an increase in receiver gain. Detection of a link performance degradation indicator using the flat fading detector may thus be based on a gain control unit detecting a power drop in the received communications signal.

When multipath propagation causes inter-symbol interference in the received signal the adaptive equalizer is arranged to respond to this and attempt to invert the effects of the propagation channel. Processing the communications signal may thus comprise in a step S26 determining onset and level of frequency selective fading (S26) for the received communications signal. The occurrence of frequency selective fading can be detected by monitoring the equalizer taps. This is exemplified in FIGS. 7-10 where the equalizer response of a flat and a frequency selective channel are compared. Note that the equalizer center tap is not plotted in FIGS. 7-10. Detection of a link performance degradation indicator using the frequency selective fading detector may thus be based on an equalizer detecting inter-symbol interference in the received communications signal.

Figure 11:
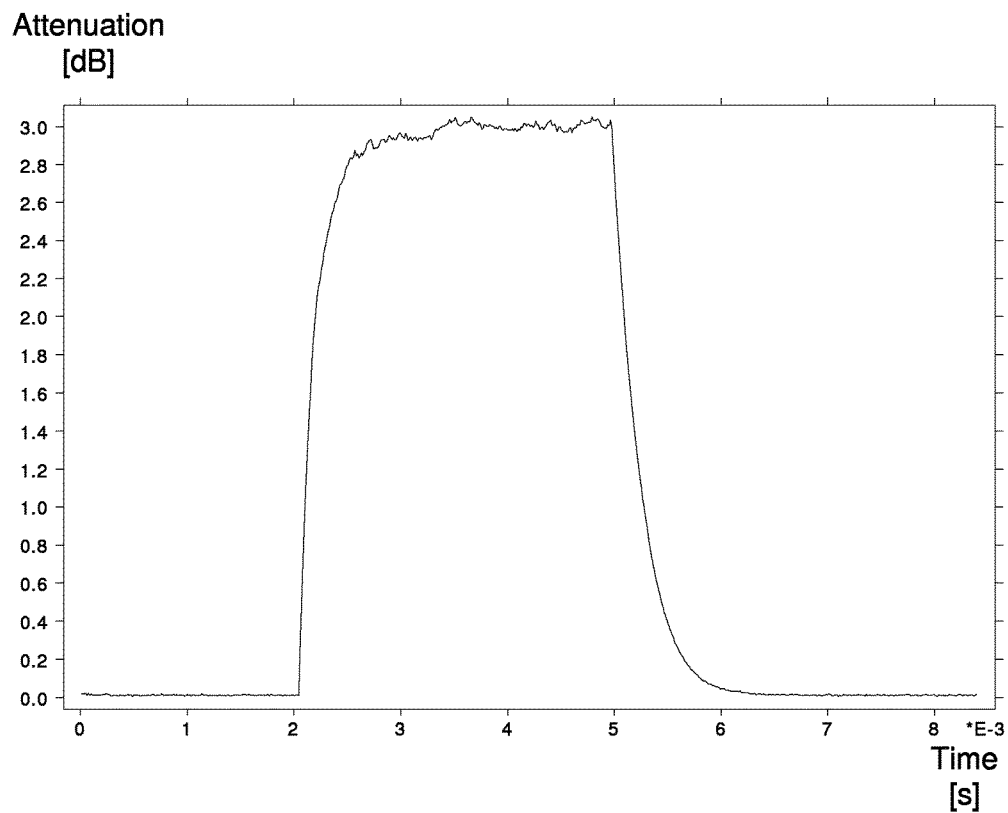
FIG. 11 schematically illustrates pre/post channel filter gain difference due to external out-of-band interference.

When an interferer is present that generates harmful interference in-band, it often also includes some interference out-of-band. This out-of-band interference is visible as a drop in signal power after channel filtering since this filtering removes such interference. Processing the communications signal may thus comprise in a step S24 determining onset and level of interference for the received communications signal. This is exemplified in FIG. 11 where the differential pre/post channel filter envelope gain is plotted as an interferer is turned on at time 2 ms and turned off again at time 5 ms. The signal power difference before and after channel filtering is therefore an indication of the presence of strong interferers. Detection of a link performance degradation indicator using the interference detector may thus be based on comparing the received communications signal before and after a channel filter has been applied to the received communications signal.

Processing the communications signal may further comprise in a step S28 determining onset and level of cross-polar interference for the received communications signal. In general terms, the cancellation (XPIC) system removes an unwanted signal that has leaked from an unwanted polarization into the desired polarization. Such unwanted polarization may be the result of scattering and/or reflections from land or water surfaces, reflections from an atmospheric layer and/or tropospherical turbulence. Detection of a link performance degradation indicator using the XPI detector may thus be based on an equalizer detecting, step S30, onset and level of correlation between the communications signal and a secondary reference signal.

Figure 12:
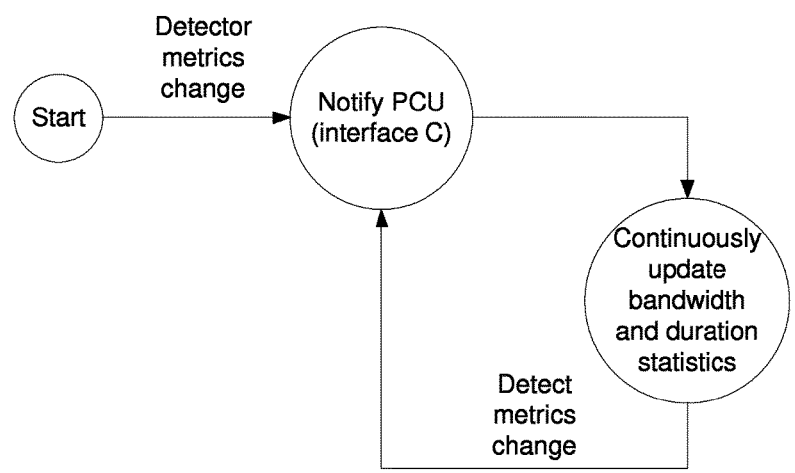
FIG. 12 is a state diagram according to embodiments.

Information from one or more of the detectors in FIG. 6 is passed to an information processing device that operates according to the state diagram schematically illustrated in FIG. 12. The state diagram of FIG. 12 has three states, one of which is a start state (denoted "start") and two of which are work states. When metric changes are detected the packet control unit 6 is notified. Hence, in a step S6 the packet control unit 6 is by the microwave link modem 4 provided with information relating to the one or more link performance degradation indicators. Control of the microwave link is thereby facilitated. The information is transmitted by the transmitter of the microwave link modem 4 implementing interface C. The information provided to the packet control unit 6 may comprise a level of bandwidth reduction and expected time duration for the bandwidth reduction.

The microwave link modem 4 then proceeds to gather and update statistical information about the event, e.g., the time duration over which the metrics stay constant, and the bandwidth achieved for a given set of metrics. Particularly, in a step S16, statistics relating to link performance degradation indicators of a plurality of microwave links and/or to previously detected link performance degradation indicators of the microwave link are acquired. Accuracy of characteristics and predictions may be improved by being based on statistics from several microwave links. Accuracy of characteristics and predictions may also be improved by external sources, including weather services and frequency planning data. The acquired statistics may thus be based on at least one of weather services, frequency planning data, information from at least one further microwave link modem, and information from at least one further packet control unit. The microwave link modem 4 may thus further be arranged to continuously update bandwidth and duration statistics. Thus, each individual link will characterize its bandwidth as a function of the metrics described above. The packet control unit 6 is given access to the gathered statistics, and is then capable of making more informed forwarding decisions based on available data and detected metrics. As soon as detector metrics change significantly according to some given criterion, the packet control unit in FIG. 3 is notified of the change.

Gathered statistics may represent the mean of all observations. According to an embodiment metrics are quantized down to binary metrics, i.e., on/off type of metrics. At least one detector may thus provide a binary decision relating to whether a performance degradation has been detected or not. Alternatively a finer quantization of the temporal bandwidth characterization metrics, is provided. This may allow more detailed information to be passed to the packet control device. Thus at least one detector may provide a multi-level decision relating to whether a performance degradation has been detected or not.

Figure 13:
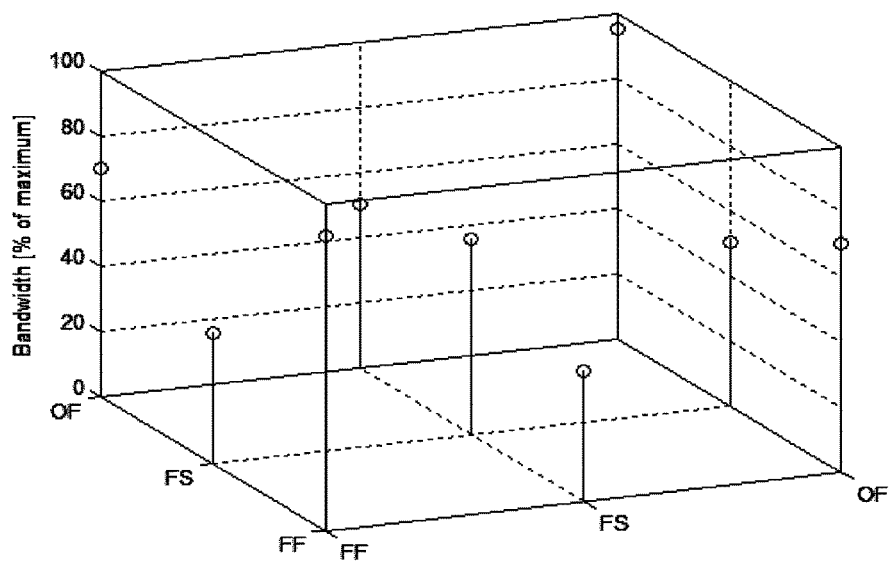
FIG. 13 schematically illustrates mean bandwidth effect as function of detected metric.
Figure 14:
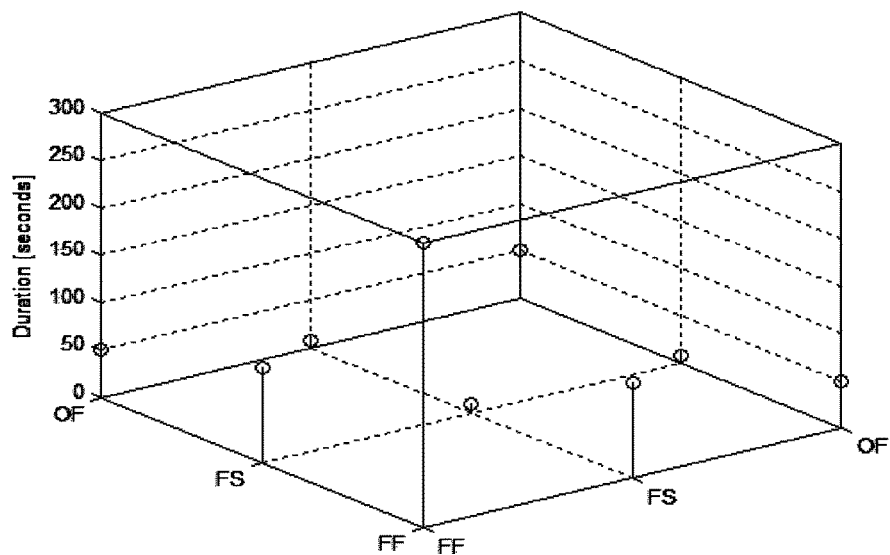
FIG. 14 schematically illustrates mean duration of events as function of detected metric.

The gathered statistical information available to the packet control unit can be illustrated according to the examples shown in FIG. 13 and FIG. 14. FIG. 13 illustrates bandwidth reduction (i.e. the reduction from 100%). FIG. 14 illustrates the time duration (in seconds) for the bandwidth reduction. In FIGS. 13 and 14 FF denotes flat fading, FS denotes frequency selective fading, and OF denotes out-ofband interference. For example, at a coordinate given by the pair [FF, FF] the bandwidth degradation (as in FIG. 13) and the duration of the bandwidth degradation (as in FIG. 14) resulting for pure flat fading is illustrated. For example, at a coordinate given by the pair [FS, OF] the bandwidth degradation (as in FIG. 13) and the duration of the bandwidth degradation (as in FIG. 14) resulting for a combination of frequency selective fading and out-of-band interference is illustrated. When a given detector triggers, the packet control unit can estimate the duration of the event that currently causes the reduction in bandwidth and take appropriate action. Hence, the packet control unit 6 may, in a step S8, perform an action based on the information provided by the microwave link modem 4. The action may comprise in a step S10 identifying data packets scheduled to be transmitted on the microwave link to be re-routed to another microwave link. Hence, packets already received by the site 2 may be re-routed. Alternatively the action comprises discarding, in a step S12, the information provided by the microwave link modem. For instance, as in the present example, when detecting a flat fading event the expected duration is significant, but the bandwidth reduction is comparably small due to that the link perhaps has a large fading margin whereas the combination of flat and frequency selective fading has shorter duration but higher impact on bandwidth. Hence different actions may be suitable for a flat fading event and a combined flat and frequency selective fading event.

A prediction mechanism that based on time series of measured metrics is able to predict future bandwidth changes based on observed metric trends may be provided in the information processing device. Thus, in a step S18 the one or more link performance degradation indicators may be predicted based on the acquired statistics. A bandwidth prediction mechanism may allow initiation of traffic transfer before the traffic is impacted. Outages (zero bandwidth events) may be predicted and traffic transferred with little or no effect on client experience.

Having continuous access to current characterization information determined by the microwave link modem 4 through interface C allows the packet control unit 6 to act on bandwidth changes in a, on a network level, improved way. The number and intensity of bandwidth altering events subjected to the network can therefore be reduced. By introducing the notion of an apparent bandwidth, the bandwidth that the packet domain shall perceive as being supported by the link, the relation between the packet domain and physical conditions on the link is loosened. The action performed by the packet control unit 6 may thus be based on a bandwidth parameter (i.e. he apparent bandwidth) relating to a bandwidth which the packet control unit perceives as being supported by the microwave link. The bandwidth parameter may be based on a current bandwidth of the microwave link and at least one of the level of bandwidth reduction and the time duration for the bandwidth reduction.

The extent to which the apparent bandwidth follows the current bandwidth may be moderated by the packet control unit in a number of ways.

According to embodiments, for events with an indication of short duration the apparent bandwidth can be kept constant. Any loss of bandwidth in this case may be handled locally by buffering.

According to embodiments, for events with an indication of a small change in bandwidth the apparent bandwidth can be kept constant under assumption that the current traffic load is in the limit of the current bandwidth and the local buffering capabilities.

According to embodiments the bandwidth parameter may thus be based on a time-averaged bandwidth prediction of the microwave link. Using said information from the physical layer, multiple quick changes in bandwidth may be predicted and smoothed using buffering. Network wobbling may thereby decrease.

According to embodiments the number of possible apparent bandwidth levels can be set to a lower number then the possible number of current bandwidths. The bandwidth parameter may thus take values in a set having fewer members than the number of possible current bandwidths. Then, by mapping several current bandwidths to one apparent bandwidth the number of events in the apparent bandwidth (which is propagated into the packet control domain) will be less then the number of events in the current bandwidth.

According to embodiments, for events where it may be deduced from the characteristics information that the link can not sustain traffic, groups of flows may be requested to be moved, potentially releasing bandwidth that may support other flows (dependant on network level configuration this can then induce changes on a different level of scale) or packets may be marked in such a fashion that the transmitter and/or receiver of the packet is able to detect that congestion will occur, thereby allowing for preventive actions.

One or more bandwidth parameters may be used to moderate/improve (or even optimize) the amount of traffic routed over a particular link, potentially also in cooperation between several packet control units. In other words, packet routing may thereby be influenced so that more packets are not transmitted to a particular link. The packets may thus be routed over another path through the network. Therefore the bandwidth parameter may in a step S14 be transmitted to a packet control unit of another microwave link modem. Further, the bandwidth parameter may be propagated to other packet control units so that when new paths are created they are routed over links with bandwidth parameters that indicate that a link can sustain the traffic. The bandwidth parameter may also be propagated to other packet control units so that when these other packet control units schedule packets they can perform load balancing over several links based on several bandwidth parameters. For example, the step S10 of identifying data packets scheduled to be transmitted may be based on the bandwidth parameter and/or a further bandwidth parameter received from a packet control unit of another microwave link modem. Further, as in step S10 packets may be sent on links where the bandwidth parameter indicates that they can be accommodated.

The packet control unit 6 may also throttle/dampen the actual bandwidth offered to packet flows in order for network clients to perceive stability during adaptive modulation events. Thus, in a step S20 a current bandwidth of the microwave link may be reduced based on the one or more link performance degradation indicators.

In summary, the disclosed embodiments are related to packet forwarding control and optimization in microwave networks implementing adaptive modulation. By exploiting information available at the microwave link modem signal processing level the packet forwarding at higher network layers can be made more robust against rapid state changes incurred in a network by dynamic local changes in individual link bandwidth.

The invention has mainly been described above with reference to a few embodiments. However, as is readily appreciated by a person skilled in the art, other embodiments than the ones disclosed above are equally possible within the scope of the invention, as defined by the appended patent claims. For example, the microwave link modem 4 may, through interface C, which provides detailed statistics of the causes and impact to link performance, also be connected to a network management system, NMS, to support link and network level performance improvement activities.

The invention claimed is:

1. A method for microwave link control, comprising the steps of:
   a first microwave link modem receiving a communications signal transmitted by a second microwave link modem using a first microwave link that wirelessly connects the first microwave link modem with the second microwave link modem;
   the first microwave link modem processing the received communications signal to produce information bits;
   the first microwave link modem providing the information bits to a traffic handling function;
   the first microwave link modem, as a result of processing the received communications signal, detecting one or more link performance degradation indicators related to the first microwave link;
   the first microwave link modem providing link performance degradation information relating to the one or more link performance degradation indicators;
   determining, based on the link performance degradation information provided by the microwave link modem, whether a data packet scheduled to be transmitted by the first microwave link modem by the second microwave link modem using the first microwave link should be re-routed to a third microwave link modem wirelessly connected to the first microwave link modem by a second microwave link that is separate and distinct from the first microwave link, wherein the third microwave link modem and the second microwave link modem are located at separate and distinct geographical sites; and
   as result of determining that the data packet should be re-routed to said third microwave link modem, the first microwave link modem transmitting the data packet to the third microwave link modem over the second microwave link instead of transmitting the data packet to the second microwave link modem over the first microwave link.

2. The method according to claim 1, wherein the link performance degradation information indicates a bandwidth reduction of the first microwave link.

3. The method according to claim 2, wherein the link performance degradation information comprises information indicating a level of the bandwidth reduction and duration information indicating an expected time duration for the bandwidth reduction.

4. The method according to claim 1, wherein the one or more link performance degradation indicators indicate a cause of link performance degradation.

5. The method according to claim 1, wherein detecting the one or more link performance degradation indicators comprises: detecting a level of flat fading, detecting an interference level, and detecting a level of frequency selective fading.

6. The method according to claim 1, wherein the microwave link modem comprises: an amplifier, a channel filter coupled to an output of the amplifier, an equalizer coupled to an output of the channel filter, a symbol detector coupled to the output of the channel filter, and a forward error correction (FEC) function coupled to the symbol detector.

7. The method according to claim 4, wherein determining whether the data packet should be re-routed to the third microwave link modem is further based on a bandwidth parameter relating to a bandwidth which is perceived as being supported by the first microwave link.

8. The method according to claim 7, wherein the bandwidth parameter is based on a current bandwidth of the first microwave link and at least one of a level of bandwidth reduction and a time duration for the bandwidth reduction.

9. The method according to claim 7, wherein the bandwidth parameter is based on a time-averaged bandwidth prediction of the first microwave link.

10. The method according to claim 7, wherein the bandwidth parameter takes values in a set having fewer members than the number of possible current bandwidths.

11. The method according to claim 7, wherein determining whether the data packet should be re-routed to the third microwave link modem is further based on a bandwidth parameter received from another microwave link modem.

12. The method according to claim 7, further comprising transmitting the bandwidth parameter to another microwave link modem.

13. The method according to claim 1, further comprising acquiring statistics relating to one or more of: link performance degradation indicators of a plurality of microwave links and previously detected link performance degradation indicators of the microwave link.

14. The method according to claim 13, wherein the acquired statistics is based on at least one of weather services, frequency planning data, and information from at least one further microwave link modem.

15. The method according to claim 13, further comprising predicting the one or more link performance degradation indicators based on the acquired statistics.

16. The method according to claim 1, further comprising reducing a current bandwidth of the first microwave link based on the one or more link performance degradation indicators.

17. The method according to claim 1, wherein
   processing the communications signal comprises determining a level of flat fading for the communications signal, and
   the determined level of flat fading is one of said one or more link performance degradation indicators.

18. The method according to claim 17, wherein determining a level of flat fading for the communications signal comprises detecting a power drop in the received communications signal.

19. The method according to claim 1, wherein
   processing the communications signal comprises determining a level of interference for the received communications signal, and
   the determined level of interference is one of said one or more link performance degradation indicators.

20. The method according to claim 19, wherein determining the level of interference for the received communications signal comprises comparing the received communications signal to a filtered version of the received communications signal.

21. The method according to claim 1, wherein
   processing the communications signal comprises determining a level of frequency selective fading for the received communications signal, and
   the determined level of frequency selective fading is one of said one or more link performance degradation indicators.

22. The method according to claim 21, wherein determining the level of frequency selective fading for the received communications signal comprises detecting inter-symbol interference in the received communications signal.

23. The method according to claim 1, wherein
processing the communications signal comprises determining a level of cross-polar interference for the received communications signal, and
the determined level of cross-polar interference is one of said one or more link performance degradation indicators.

24. The method according to claim 23, wherein determining a level of cross-polar interference for the received communications signal comprising using a cross-polar interference detector based on detecting, by an equalizer, onset and level of correlation between the communications signal and a secondary reference signal.

25. The method according to claim 1, wherein a detector provides a binary decision relating to whether a performance degradation has been detected.

26. The method according to claim 1, wherein a detector provides a multi-level decision relating to whether a performance degradation has been detected.

27. A first microwave link modem for microwave link control, comprising:
a data storage; and
one or more processors coupled to the data storage, wherein the first microwave link modem is configured to:
receive a communications signal transmitted by a second microwave link modem using a first microwave link that wirelessly connects the first microwave link modem with the second microwave link modem;
process received communication signal to produce information bits;
provide the information bits to a traffic handling function;
as a result of processing the received communications signal, detect one or more link performance degradation indicators related to the first microwave link;
provide link performance degradation information relating to the one or more link performance degradation indicators;
determine, based on the link performance degradation information provided by the first microwave link modem over the first communication link should be re-routed to a third microwave link modem wirelessly connected to the first microwave link modem by a second microwave link that is separate and distinct from the first microwave link, wherein the third microwave link modem and the second microwave link modem are located at separate and distinct geographical sites; and
as a result of determining that the data packet should be re-routed to said third microwave link modem, transmit the data packet to the third microwave link modem over the second microwave link instead of transmitting the data packet to the second microwave link modem over the first microwave link.

28. A first microwave link modem comprising a non-transitory computer readable medium storing a computer program for microwave link control, the computer program comprising computer program code which, when run on at least one processing unit, causes the at least one processing unit to:
process a communications signal to produce information bits, wherein the communications signal was transmitted by a second microwave link modem using a first microwave link that wirelessly connects the first microwave link modem with the second microwave link modem;
provide the information bits to a traffic handling function;
as a result of processing the received communications signal, detect one or more link performance degradation indicators related to the first microwave link;
provide link performance degradation information relating to the one or more link performance degradation indicators;
determine, based on link performance degradation information provided by the first microwave link modem, whether a data packet scheduled to be transmitted to the second microwave link modem over the first communication link should be re-routed to a third microwave link wirelessly connected to the first microwave link modem by a second microwave link that is separate and distinct from the first microwave link, wherein the third microwave link modem and the second microwave link modem are located at is separate and distinct geographical sites; and
as a result of determining that the data packet should be re-routed to said third microwave link modem, transmit the data packet to the third microwave link modem over the second microwave link instead of transmitting the data packet to the second microwave link modem over the first microwave link.

* * * * *

UNITED STATES PATENT AND TRADEMARK OFFICE
CERTIFICATE OF CORRECTION

PATENT NO. : 9,674,718 B2
APPLICATION NO. : 14/420105
DATED : June 6, 2017
INVENTOR(S) : Ahlqvist et al.

It is certified that error appears in the above-identified patent and that said Letters Patent is hereby corrected as shown below:

On the Title Page

In Item (75), under "Inventors", in Column 1, Line 1, delete "Fjaras" and insert -- Fjärås --, therefor.

In the Drawings

Figure 7:
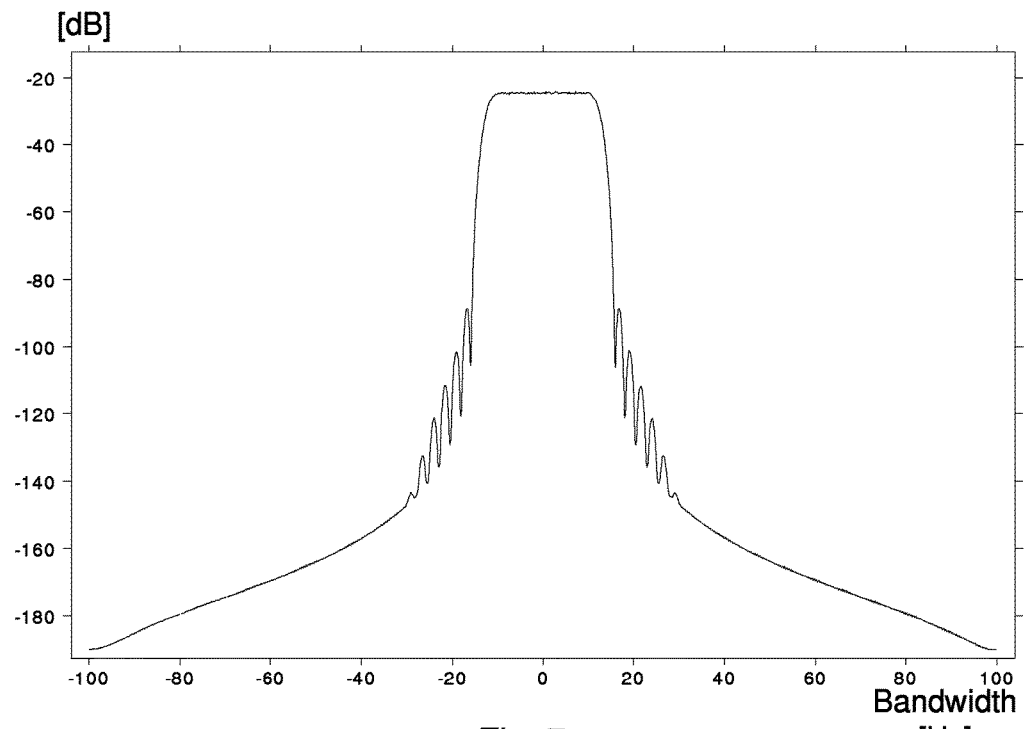
FIG. 7 schematically illustrates an example of flat fading.
Figure 8:
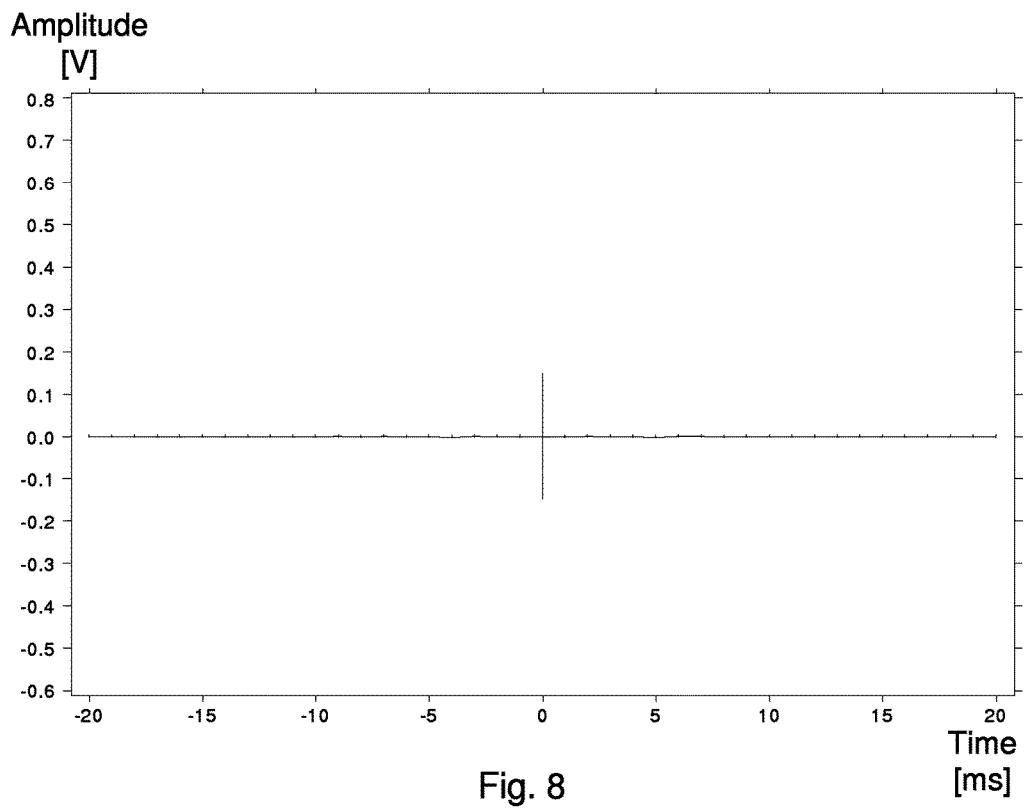
FIG. 8 schematically illustrates a (non-existent) equalizer pulse response for flat fading.
Figure 9:
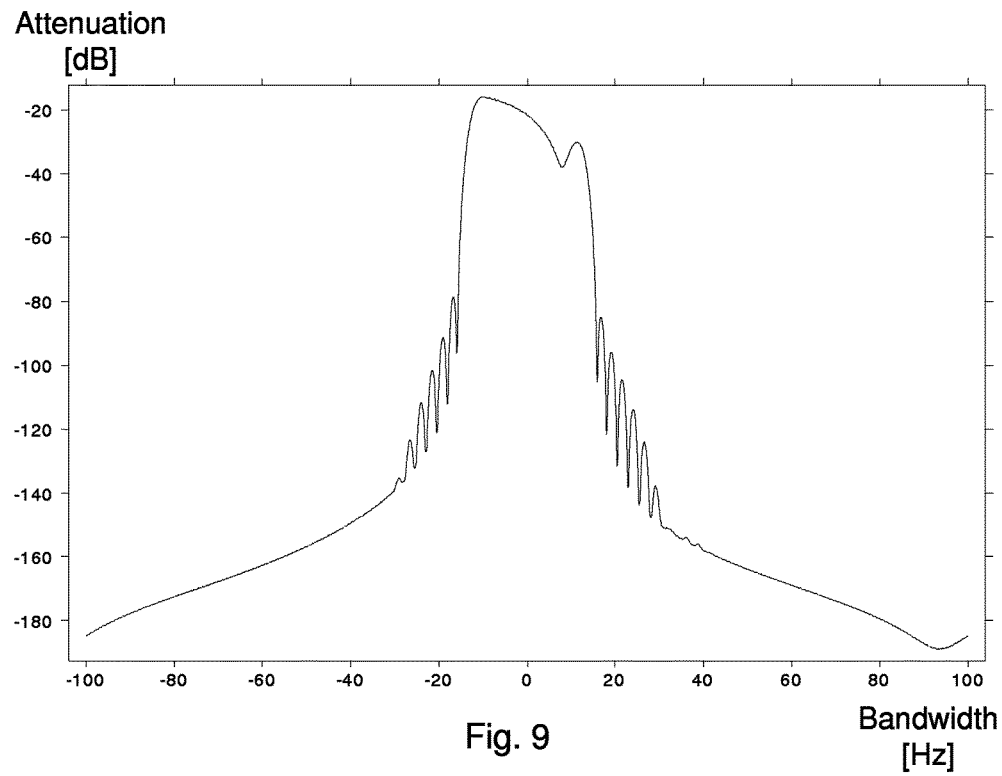
FIG. 9 schematically illustrates frequency selective fading.
Figure 10:
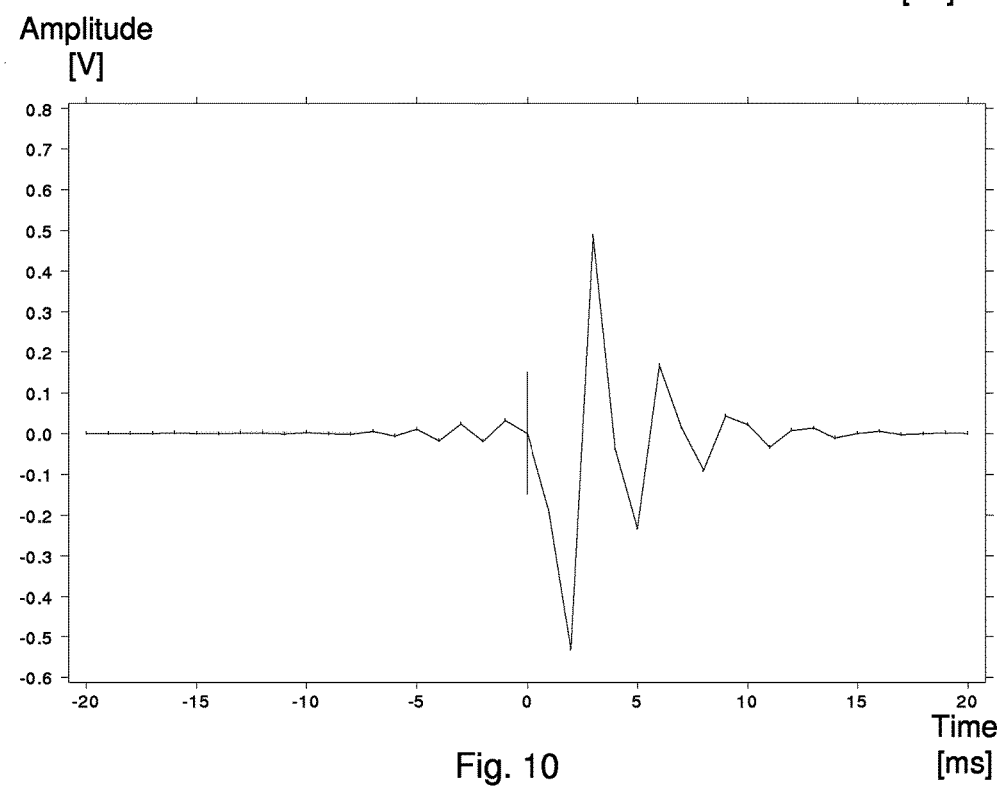
FIG. 10 schematically illustrates the equalizer compensation pulse response for frequency selective fading.

On Sheet 5 of 9, replace Fig. 7 with the attached Fig. 7.

In the Specification

In Column 2, Line 38, delete "of if" and insert -- if --, therefor.

In Column 4, Line 22, delete "2C." and insert -- 2c. --, therefor.

In Column 5, Line 39, delete "modem 2" and insert -- modem 4 --, therefor.

In Column 6, Line 10, delete "FIG. 4." and insert -- FIG. 4.) --, therefor.

In Column 10, Line 15, delete "less then" and insert -- less than --, therefor.

In the Claims

In Column 11, Line 26, in Claim 1, delete "by the microwave" and insert -- by the first microwave --, therefor.

In Column 11, Line 28, in Claim 1, delete "by the second" and insert -- to the second --, therefor.

In Column 11, Line 37, in Claim 1, delete "as result" and insert -- as a result --, therefor.

Signed and Sealed this
Fourteenth Day of November, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,674,718 B2

In Column 13, Line 32, in Claim 27, delete "process received communication" and insert -- process the received communications --, therefor.

In Column 14, Line 30, in Claim 28, delete "based on link" and insert -- based on the link --, therefor.

In Column 14, Line 35, in Claim 28, delete "link wirelessly" and insert -- link modem wirelessly --, therefor.

In Column 14, Line 39, in Claim 28, delete "at is seperate" and insert -- at separate --, therefor.